(12) United States Patent
Whittenbury

(10) Patent No.: US 6,476,347 B1
(45) Date of Patent: Nov. 5, 2002

(54) LASER-ASSISTED CUTTING DEVICE

(76) Inventor: Clive G. Whittenbury, 511 Trinity Ave., Yuba City, CA (US) 95991

( * ) Notice: Subject to any disclaimer, the term of this patent is extended or adjusted under 35 U.S.C. 154(b) by 0 days.

(21) Appl. No.: 09/545,663

(22) Filed: Apr. 7, 2000

Related U.S. Application Data

(63) Continuation of application No. 09/009,908, filed on Jan. 21, 1998.

(51) Int. Cl.[7] .............................. B23K 26/00; B27L 5/00
(52) U.S. Cl. ..................... 219/121.67; 83/170; 144/212
(58) Field of Search ..................... 219/121.67, 121.68; 30/140; 83/170, 171, 520; 144/212

(56) References Cited

U.S. PATENT DOCUMENTS

| | | | |
|---|---|---|---|
| 3,866,642 A | 2/1975 | Walser | 83/170 X |
| 4,273,127 A | 6/1981 | Auth et al. | 219/121.6 X |
| 4,281,696 A | 8/1981 | Howard et al. | 144/312 |
| 4,469,931 A | 9/1984 | Macken | 219/121.67 |
| 4,627,435 A | 12/1986 | Hoskin | 30/140 X |
| 4,650,955 A | 3/1987 | Zaborowski | 219/121.67 |
| 4,807,623 A | 2/1989 | Lieberman | 30/300 X |
| 4,887,219 A | 12/1989 | Strauser | 364/474.09 |
| 4,907,632 A | 3/1990 | Reuter | 144/356 |
| 4,941,100 A | 7/1990 | McFarlane et al. | 364/474.09 |
| 4,943,700 A | 7/1990 | Hughes et al. | 219/121.67 |
| 5,038,481 A * | 8/1991 | Smith | 83/520 X |
| 5,065,515 A | 11/1991 | Iderosa | 30/140 |
| 5,099,896 A | 3/1992 | Ritola | 144/357 |
| 5,375,495 A * | 12/1994 | Bosten et al. | 83/520 |
| 5,381,712 A | 1/1995 | Head, Jr. et al. | 83/418 |
| 5,382,772 A | 1/1995 | Zumstein | 219/121.69 |
| 5,533,266 A | 7/1996 | Kelman | 30/140 X |
| 5,538,056 A | 7/1996 | Thoma | 144/342 |
| 5,578,229 A | 11/1996 | Barnekov et al. | 219/121.67 X |
| 5,859,405 A | 1/1999 | Golz et al. | 219/121.67 |
| 6,294,757 B1 * | 9/2001 | Whittenbury | 219/121.72 |

* cited by examiner

*Primary Examiner*—Charles Goodman
(74) *Attorney, Agent, or Firm*—Townsend and Townsend and Crew LLP

(57) ABSTRACT

The present invention provides an apparatus for cutting wood or other materials by separating the material along a line of controlled failure through the application of mechanical force in combination with laser light to break molecular bonds holding the material together along the line of controlled failure. A preferred embodiment of the cutting apparatus is a generally broad wedge-shaped blade having planar lower and upper surfaces which converge toward each other to terminate along a leading edge. The blade is generally hollow with a cavity for passing optical fibers carrying laser light to a transparent window attached to the leading edge of the blade. Laser light passes through the window and is directed to a line of controlled failure in the material being cut to break the molecular bonds and locally weaken the material.

12 Claims, 2 Drawing Sheets

LASER-ASSISTED CUTTING DEVICE

CROSS REFERENCE TO RELATED APPLICATION

This is a continuation of application Ser. No. 09/009,908 filed Jan. 21, 1998.

BACKGROUND OF THE INVENTION

The present invention relates generally to cutting devices and more specifically to a method and device for cutting or machining wood, and other materials capable of being cut or machined by similar techniques, with the assistance of a laser.

A number of devices for cutting wood and similar materials are known in the prior art. Prior Art devices for cutting wood include knives, chisels, saw-teeth, machining bits and tools, and lasers. Examples of prior art cutting devices include: Apparatus for dividing wood, U.S. Pat. No. 5,179,883; Veneer Slicer Machine, U.S. Pat. No. 3,796,243; Wood Slicer Machine, U.S. Pat. No. 3,783,917; Process for slicing veneer, U.S. Pat. No. 4,362,197; Method and apparatus for cutting boards using opposing convergent laser light, U.S. Pat. No. 5,578,229; Machine tool with a laser beam cutting device, U.S. Pat. No. 4,335,296; Laser assisted saw device, U.S. Pat. No. 4,469,931; Laser cutting process, U.S. Pat. No. 5,374,803; Laser beam machine and laser beam machining method, U.S. Pat. No. 5,582,749; Laser deep cutting process, U.S. Pat. No. 3,965,328.

However, the prior art devices use traditional mechanical cutting methods or use the thermal heat from a laser to decompose and vaporize, or burn a cut into, the material. Use of prior art devices often results in material loss from the width of the cutting device, in damage to the surface from burns, or in cuts which lack desired accuracy. Products made from wood, and other materials capable of being cut or machined by similar cutting techniques, can be fabricated more efficiently and with less material loss when the width of the cut, or kern is reduced. Further efficiency and increased product value is gained by reducing damage to separated material surfaces by improving cut accuracy which results in a better finish after the cutting process.

Although increased cut accuracy and cutting ease can be achieved by preparing wood or similar material such as by steaming or soaking the material in a liquid bath (for slicing or peeling veneers), or by drying the wood before planing (to increase surface smoothness), these and other pre-cut preparation techniques are expensive, time consuming, and may cause undesirable and irreversible changes to the body of the material beyond the specific area of the material being cut or machined.

SUMMARY OF THE INVENTION

The present invention provides a method and apparatus for cutting wood, or other materials capable of being cut or machined using similar methods, by separating the material along a line of controlled local failure in the material through the application of mechanical force as imparted by a wedge (e.g., knife blade) in combination with a laser beam to break molecular bonds that naturally hold the material together at the line of controlled failure.

Advantages of the present invention include efficient cuts without damage to the wood or other material, elimination of expensive or time-consuming preparation techniques, reduction in the loss of material from the width of the cutting device, improved accuracy of the cut, and improved quality of the separated surfaces on each side of the cut.

The present invention uses laser light to assist a mechanical cutting blade by locally weakening the material along the line of controlled failure. The laser light breaks molecular bonds at the line of controlled failure within the material being cut while the blade separates the material and advances the line of controlled failure in front of the blade to create the cut and a continuing path for the blade. The laser significantly reduces the force required to separate the material along the line of controlled failure and induces material failure without significant damage to material adjacent to the cut.

In a preferred embodiment of the invention, the leading edge of a wedge-shape mechanical cutting blade contains a window made of a material that transmits laser light. Light from a laser reaches the window through optical fibers connected to, and contained in the body of, the blade. During a cutting operation laser light from the laser unit is directed through a window mounted at the leading edge of the blade, and into the region in front of the blade where a line of controlled failure is induced in the material by the laser light. The laser light breaks the molecular bonds in the wood to assist the cutting process at the line of controlled failure.

Further, while a conventional blade separates material in the path of the blade along fault lines or defects in the material which do not follow straight lines in front of the blade, the laser-assist of the present invention controls the path of failure and thereby avoids meandering cuts and inaccurate surface finishes that result from natural fractures and defects. The present invention is capable of cutting very thin sections of material in one pass more accurately and efficiently than prior art devices because there is essentially no material loss from the cut.

The laser reduces the normal mechanical force required to cut material, thereby reducing the power and time required to cut the material. The present invention can therefore increase production over prior art devices while providing improvements in the quality and accuracy of the cut surfaces without prior special preparation of the material.

A further understanding of the nature and advantages of the invention may be realized by reference to the remaining portions of the specification and the drawings.

DESCRIPTION OF THE SPECIFIC EMBODIMENTS

The present invention is directed to improving conventional wood-cutting techniques such as those employing a wedge-shaped blade that operates to separate the material (e.g., wood) into separate pieces. Contrary to popular thought, wood-cutting (e.g., to produce thin wood sheets) does not use the so-called cutting edge of the blade-except at initial entry of the blade into the wood. When the separation of the wood begins after entry, the pushing forces imparted on the wood by the surfaces of the blade perform the cutting and separation by leveraging those forces ahead of the cutting edge to cause natural fracturing or induce failure of the material at its naturally weakest points. The leading edge of the blade is actually disposed from the line of separation of the wood. If some of the molecular bonds of the wood at a controlled line of separation are broken by a laser and the material is weakened, the forces needed to drive the wood apart are reduced and surfaces can be separated more accurately. This is the function of the present invention.

Figure 1:
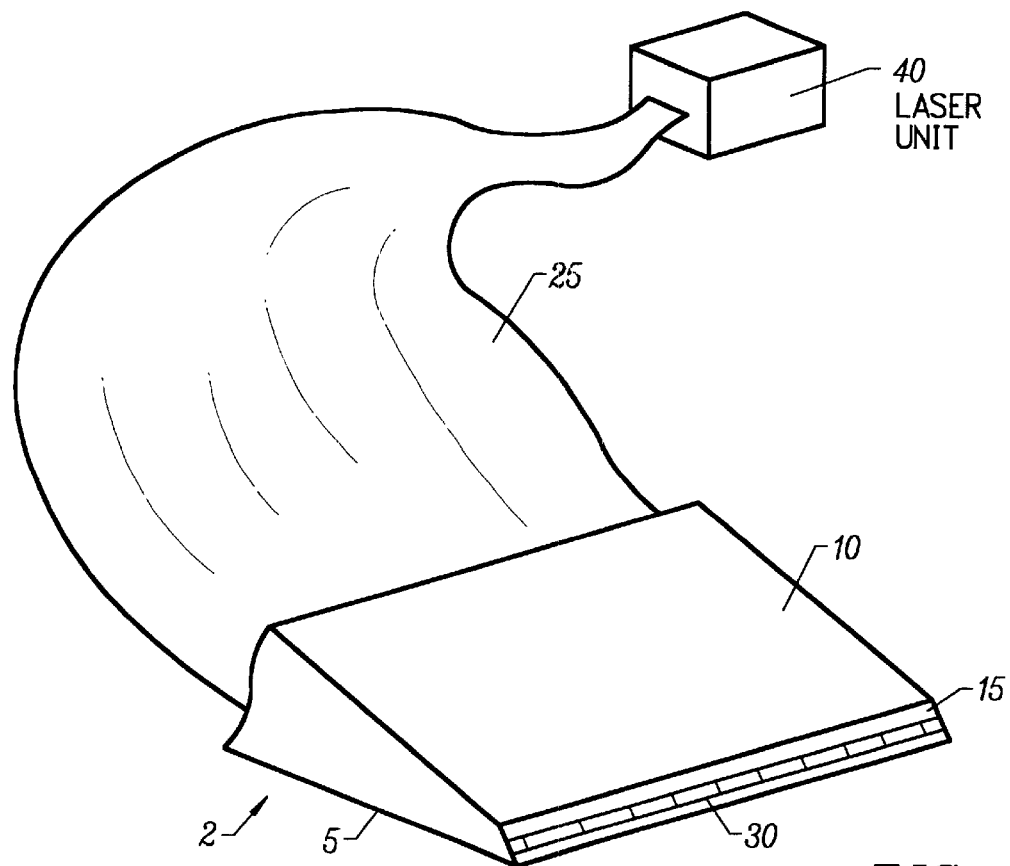
FIG. 1 is a perspective view of the cutting device.

Referring now to FIG. 1 there is shown a preferred embodiment of the invention in the form of a cutting blade 2 which may be fabricated of metal or other suitable materials. Blade 2 is generally wedge-shaped with broad, planar lower and upper surfaces 5, 10 which converge toward each other to terminate along a leading edge 15. A preferred embodiment of blade 2 can be constructed from two pieces, enclosing a cavity 27 and firmly attached together such that lower surface 5 and upper surface 10 are smooth and unobstructed. An acute angle formed by lower surface 5 and upper surface 10 may be small or large depending on the cutting application.

Figure 2:
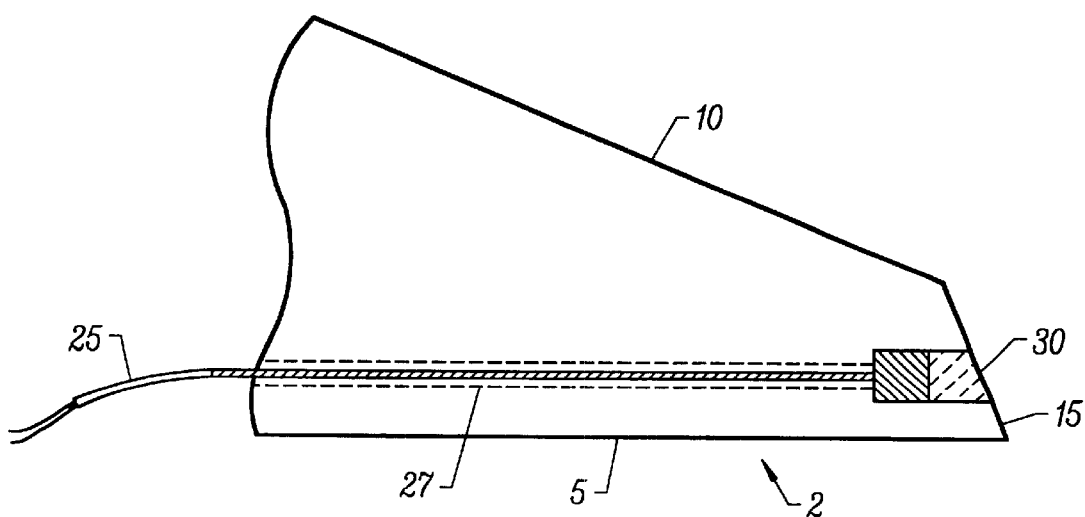
FIG. 2 is a side view of the cutting device.

As shown in FIG. 2, optical fibers 25 pass through the cavity 27 formed by the two parts of the blade 2 to carry laser light to the leading edge 15 of the blade. The cavity 27 terminates at window 30 along leading edge 15. A window 30 extends along leading edge 15 of blade 2 and provides a transparent medium for transmission of laser light from optical fibers 25 into the open region in front of blade 2.

The window 30 is configured to fit between the lower and upper surfaces 5, 10 at the leading edge 15 and fabricated to match optical requirements for propagation of laser light from the optical fibers 25 to the region in front of blade 2. Window 30 can be made of quartz, glass, diamond or other transparent materials that match the laser characteristics, the expected working environment and the detailed mechanical design of the blade.

The optical fibers 25 connect a source of laser light illumination, shown here as a laser unit 40, to leading edge 15 of blade 2 for transmission through the window 30.

Several different types of lasers may be used, depending upon the various materials to be cut. Differences in the energy bonds and their characteristics will require different lasers that generate and amplify light of different wavelengths, from ultraviolet to infrared, with different pulse characteristics. The preferred characteristics are pulsed lasers at ultraviolet wavelengths with short pulse lengths between picoseconds and femtoseconds.

Generally, the present invention operates by projecting laser light produced by laser unit 40 through the optical fibers 25 to the leading edge 15 of blade 2 and through window 30 onto a line of controlled failure in the material being cut to thereby break molecular bonds holding the material together. The laser light breaks molecular bonds along the line of controlled failure in the material, while blade 2 is advancing into the material and thereby applying forces against the separated surfaces of the material to advance the controlled line of failure into the material and create the separated surfaces.

Figure 3:
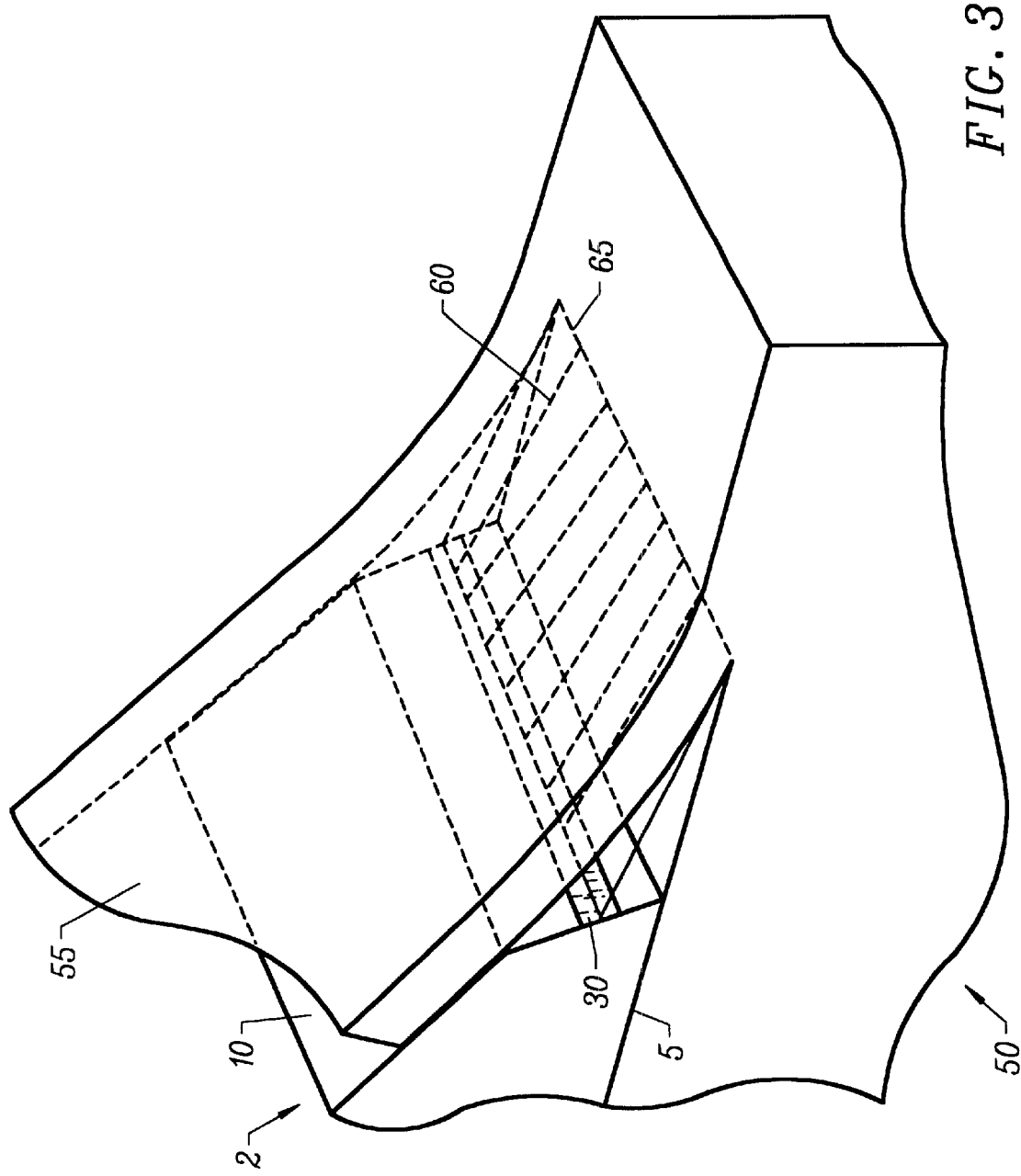
FIG. 3 is a perspective view of the cutting device in use on a block of wood.

As an example, and referring to FIG. 3, blade 2 is thrust into a wood block 50 to separate slice 55 from block 50 at the line of controlled failure 65. A force is applied to blade 2 to advance it along the direction of the cut (i.e., toward the controlled line of failure 65). Block 50 and slice 55 are forced apart by the lower and upper surfaces 5, 10 as blade 2 advances into block 50. Lower surface 5 exerts force against block 50 while upper surface 10 exerts force against slice 55 advancing the line of controlled failure 65 into the inside surfaces of slice 55 and block 50 bounding the cut. The force imparted on blade 2 causes slice 55 to bend away from block 50 just beyond the line of controlled failure 65 where slice 55 is still joined to block 50.

If blade 2 remains stationary after a forward thrust into block 50 without assistance of the laser, the line of failure 65 tends to move away from leading edge 15 until the applied forces are balanced by the binding force of the material's fibers at the line of failure 65. Without the assistance of the laser, the fibers in the material would take a finite time (fractions of a second to minutes) to part after a suitable force is applied because of the "creep" properties of natural polymers like wood. Fiber separation (without weakening of the material by a laser) is more even and accurate if blade 2 is pushed slowly into the wood and conversely, it can be rough and inaccurate if blade 2 is pushed into the wood quickly. The use of the laser to assist blade 2 as it moves through the material increases both the speed and the accuracy with which blade 2 can cut through the material. This also provides an improved finish on both surfaces resulting from the cut.

Laser light 60 is guided from the laser unit 40 to leading edge 15 of blade 2 by optical fibers 25. The optical fibers can be made from flexible fibers, or can be replaced by a waveguide which can be made from carefully shaped cavities or other standard optical elements for transporting laser light. The optical fibers can be aligned into a flat ribbon as shown in FIG. 1 or can be bound into any other suitable shape that fits within cavity 27.

Laser unit 40 may contain a laser oscillator and amplifier system which generates laser light of suitable power, wavelengths and pulse shape for transmission through optical fibers 25 and through window 30 at the leading edge 15 of blade 2.

The laser light 60 is directed onto wood block 50 along the line of controlled failure 65 where the wood is still joined by the strength of its molecular bonds. The laser light breaks molecular bonds of the wood along a line of controlled failure 65 where slice 55 and block 50 are still joined such that a well defined and accurate separation takes place in front of blade 2. Separation of the wood surfaces takes place well in front of the blade and not by contact between the blade and the line of controlled failure. The open geometry between the leading edge of the blade and the line of controlled failure allows the blade to direct the laser light along the line of controlled failure in front of the blade. The distance between the leading edge of the blade and the line of controlled failure remains essentially the same as the block of wood is moved past the blade.

The energy required by the laser to weaken the material by breaking some molecular bonds is less than the additional energy required to generate sufficient mechanical force for the blade to separate the materials' surfaces without the assistance of the laser. The laser light reduces the total energy required to cut the material to a given depth while creating a more accurate and less damaging cut.

The present invention reduces the power required to cut wood and other materials capable of being cut or machined by similar techniques, reduces the time necessary to cut a given area of wood surface, eliminates pre-cut preparation and increases accuracy and cleanliness of the cut.

While the above is a complete description of the preferred embodiments of the invention, various alternatives, modifications, and equivalents may be used. Therefore, the above description should not be taken as limiting the scope of the invention which is defined by the appended claims.

What is claimed is:

1. A laser-assisted cutting device for separating a slice of wood from a block of wood along a line of controlled failure in the block of wood through a simultaneous application of force and laser light without any other structure for cutting, comprising:

a separating means for applying force to the slice of wood and the block of wood to separate the slice of wood from the block of wood along the line of controlled failure, the separating means including a wedge-shaped blade having an upper surface and a lower surface which converge toward each other and terminate, before they meet, along a planar leading surface, said planar leading surface intersects and is connected to the upper surface and lower surface of the blade, wherein the upper surface exerts force against the slice of wood while the lower surface simultaneously exerts force against the block of wood to advance the line of controlled failure in front of the planar leading surface edge when the separating means is advanced into the block of wood;

a means for weakening the block of wood along the line of controlled failure while the separating means is advanced into the block of wood by simultaneously directing laser light from at least a portion of the planar leading surface onto the line of controlled failure as the separating means is advanced into the wood towards the line of controlled failure such that the laser light simultaneously weakens the wood along the line of controlled failure with laser light to weaken the wood without burning the wood, while the upper surface and lower surface of the blade apply force to the block of wood and slice of wood, separating the weakened wood at the line of controlled failure and advancing the line, a laser source for providing the laser light; and a means for directing the laser light from the planar leading surface of the blade forward onto the line of controlled failure.

2. A laser-assisted cutting device as described in claim 1 wherein the means for directing the laser light is a window.

3. A laser-assisted cutting device as described in claim 2 wherein the window is made of at least one ingredient selected from the group consisting of quartz and glass.

4. A laser-assisted cutting device as described in claim 1 further comprising:

a means for transporting the laser light to the planar leading surface of the blade; and at least one opening on the planar leading surface of the blade.

5. A laser-assisted cutting device as described in claim 4 wherein the means for directing the laser light is a window.

6. A laser-assisted cutting device as described in claim 5 wherein the window is made of at least one ingredient selected from the group consisting of quartz and glass.

7. A laser-assisted cutting device as described in claim 4 wherein the laser light is within a wavelength range of between ultraviolet and infrared, inclusive.

8. A laser-assisted cutting device as described in claim 7 wherein the laser source further comprises a laser oscillator and an amplifier.

9. A laser-assisted cutting device as described in claim 4 wherein the laser source further comprises a laser oscillator and an amplifier.

10. A laser-assisted cutting device as described in claim 1 wherein the laser light is within a wavelength range of between ultraviolet and infrared, inclusive.

11. A laser-assisted cutting device as described in claim 10 wherein the laser source further comprises a laser oscillator and an amplifier.

12. A laser-assisted cutting device as described in claim 1 wherein the laser source further comprises a laser oscillator and an amplifier.

* * * * *